(12) United States Patent
Florence

(10) Patent No.: US 6,345,944 B1
(45) Date of Patent: Feb. 12, 2002

(54) CARGO NET FOR PASSENGER VEHICLE

(76) Inventor: Steven Florence, 16875 Lensman Rd., St. Robert, MO (US) 65583

( * ) Notice: Subject to any disclaimer, the term of this patent is extended or adjusted under 35 U.S.C. 154(b) by 0 days.

(21) Appl. No.: 09/671,851

(22) Filed: Sep. 27, 2000

Related U.S. Application Data

(60) Provisional application No. 60/156,761, filed on Sep. 29, 1999.

(51) Int. Cl.[7] ................................................. B60P 7/14
(52) U.S. Cl. ........................ 410/118; 410/97; 410/129
(58) Field of Search ........................... 410/96, 97, 100, 410/117, 118, 129; 224/314, 318, 563; 87/2; 296/24.1, 37.8

(56) References Cited

U.S. PATENT DOCUMENTS

| | | | |
|---|---|---|---|
| 2,705,461 A | | 4/1955 | Campbell |
| 3,099,313 A | * | 7/1963 | Peck et al. .................. 410/118 |
| 4,215,895 A | | 8/1980 | Phillips |
| 4,763,944 A | | 8/1988 | Fry et al. |
| 5,026,231 A | | 6/1991 | Moore ........................ 410/118 |
| 5,040,934 A | * | 8/1991 | Ross ............................ 410/97 |
| 5,090,856 A | * | 2/1992 | Moore ........................ 410/118 |
| 5,121,958 A | | 6/1992 | Goeden et al. |
| 5,186,587 A | | 2/1993 | Moore ........................ 410/118 |
| 5,253,913 A | | 10/1993 | Metivier |
| 5,437,474 A | | 8/1995 | Ament |
| 5,452,973 A | * | 9/1995 | Arvin ......................... 410/118 |
| 5,535,931 A | | 7/1996 | Barlow et al. |
| 5,542,591 A | | 8/1996 | Moore et al. |
| 5,632,520 A | | 5/1997 | Butz |
| 5,685,470 A | | 11/1997 | Moore |
| 5,716,176 A | | 2/1998 | Anderson .................... 410/118 |
| D392,938 S | | 3/1998 | Sylvester |
| 5,820,187 A | | 10/1998 | Ament et al. |
| 5,839,757 A | | 11/1998 | von Lange et al. |
| 5,893,597 A | | 4/1999 | Rider |
| 6,004,084 A | | 12/1999 | Moker ........................ 410/118 |
| 6,017,174 A | | 1/2000 | Ross et al. .................. 410/100 |
| 6,030,160 A | * | 2/2000 | Moore ........................ 410/118 |
| 6,039,521 A | * | 3/2000 | Sullivan ..................... 410/118 |
| 6,059,313 A | | 5/2000 | Coogan et al. |
| 6,099,222 A | | 8/2000 | Moore ........................ 410/100 |
| 6,183,778 B1 | * | 2/2001 | Dahlgren .................... 410/100 |

* cited by examiner

Primary Examiner—Stephen T. Gordon
(74) Attorney, Agent, or Firm—Stites & Harbison, PLLC; David W. Nagle, Jr.

(57) ABSTRACT

The development relates to a cargo net for a two-passenger vehicle that is designed to create a barrier between the vehicle's cargo boot and the passenger seating section. The net has a solid fabric edging with a mesh central portion. Fasteners secure the net to one wall of the boot; attachment devices secured to a flexible cord hold the net upright behind the passenger seats of the vehicle. An alternative embodiment of the cargo net includes a pocket that can extend essentially the entire length of the cargo net, allowing the user to store smaller articles within the pocket rather than in the cargo boot.

5 Claims, 2 Drawing Sheets

CARGO NET FOR PASSENGER VEHICLE

CROSS-REFERENCE TO RELATED APPLICATION

This application claims priority from U.S. Provisional Application Ser. No. 60/156,761, filed Sep. 29, 1999, which application is incorporated herein by reference in its entirety.

BACKGROUND

The present invention relates to a cargo net for a two passenger vehicle, or a similar vehicle that has a cargo holding area directly behind the passenger seats.

Small sporty vehicles are popular among drivers of all ages. These vehicles, because of their overall small size, typically do not have traditional trunks or storage areas that are isolated from the passenger seats, but rather have a storage cargo space or boot directly behind the passenger seats where cargo can be placed. If the vehicle has a convertible top, when the top is down, it is stored in the boot.

Because the cargo space is limited, large items are typically not transported in these vehicles and predominantly small, relatively light weight articles are stored in the boot. If the driver has to stop the vehicle or make another quick move while driving, these small items can shift suddenly and may move forward into the passenger seat area, creating obstacles around the driver's seat.

Cargo nets and restraining devices for station wagon type vehicles and truck beds have been reported in the prior art. However, most of these nets are complex in design. For example, the net of U.S. Pat. No. 5,437,474, issued to Ament, describes a cargo net for a station wagon that includes breakaway stitching along the top and lower edge. If the net is impacted by a large object the stitching rips allowing the net to expand to a larger size to retain the object. While such a restraining net is useful in a vehicle that can transport large articles, it is unduly complex for restraining small, light weight objects.

Thus, it would be beneficial to have a cargo net with a simple design that could contain articles within a storage space directly behind the passenger seats of a two-passenger vehicle.

SUMMARY OF THE INVENTION

The development relates to a cargo net for a two-passenger vehicle that is designed to fit over the vehicle's cargo boot. The net has a mesh central portion and a solid fabric edging along the periphery. Along one edge is a channel through which a flexible cord, having an attachment device on each end, is threaded. Along a second edge are a series of heavy duty fasteners. The fasteners secure the net to one wall of the boot; the attachment devices hold the net open and properly positioned behind the passenger seats of the vehicle. An alternative embodiment of the cargo net includes a pocket that can extend essentially the entire length of the cargo net, allowing the user to store smaller articles within the pocket rather than in the cargo boot.

DETAILED DESCRIPTION OF THE PREFERRED EMBODIMENT

The cargo nets depicted in the various Figures are selected solely for the purposes of illustrating the invention. Other and different cargo nets may utilize the inventive features described herein as well.

Figure 1:
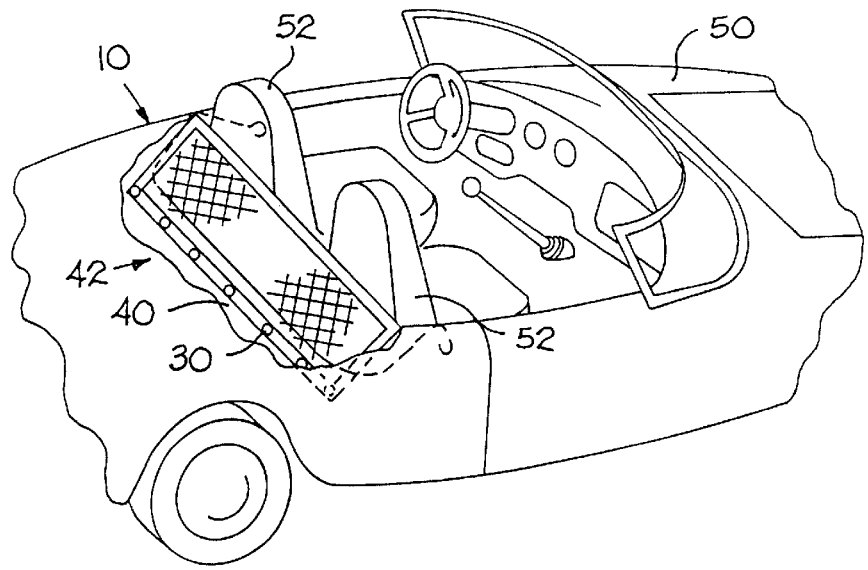
FIG. 1 is a cargo net made in accordance with the present invention mounted in the cargo boot of a small vehicle.
Figure 2:
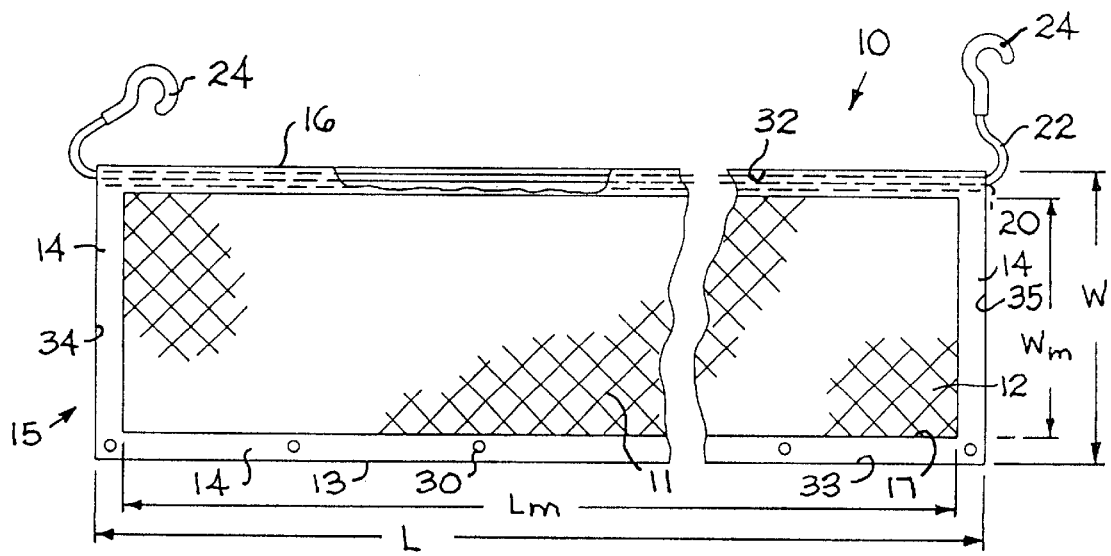
FIG. 2 is a perspective view of a cargo net of FIG. 1.

Reference is first made to FIGS. 1 and 2 in which the cargo net constructed in accordance with the present invention is generally noted by the character numeral 10. The cargo net 10 has as major components a central mesh portion 12, a solid fabric edging 14, a flexible cord 22 with at least two attachment devices 24, and at least one heavy duty fastener 30. As shown in FIG. 1, the net 10 is designed for use in a vehicle 50 that has a boot area 42 located immediately behind the passenger seats 52. The boot area 42 typically includes a shelf 40. Mounted to the shelf 40 are parts of fastening devices (not shown), such as snaps, hooks, Velcro®, or combinations thereof. The net 10 is secured to the shelf 40 by the fasteners 30, selected to complement the fastening devices mounted on the shelf 40, and is pulled upward just behind the passenger seats 52, thereby isolating the boot 42 from the passenger area. The attachment devices 24 latch onto supports (not shown), such as rods or hooks located behind the passenger seats 52 and secured to the vehicle 50, or to supports permanently attached to the passenger seats 52, to hold the net 10 upright.

As shown in FIG. 2, the net 10 includes a solid edged mesh net 15 which preferably has a rectangular shape defining a top edge 32 and a bottom edge 33, each having a length "1", and two side edges 34, 35, each having a length "w". The solid edged net 15 has a central mesh portion 12, defining a length "$1_m$" and a width "$w_m$" and a periphery 17. Typically, the mesh 12 can be any loose weave material, such as nylon fishnet or a similar material. Such materials, when cut to size for the net, tend to leave raw edges along the periphery. A solid fabric edging 14 is attached along the periphery 17 of the center mesh portion 12 such that the raw edges of the mesh 12 are completely covered by the edging 14. Preferably, the edging 14 is made from a relatively tight weave material, such as cotton cloth fabric, and is attached to the mesh by any commonly known method, such as stitching, gluing, heat sealing, or a combination thereof. The edging 14 can be secured to the mesh 12 either just along the periphery of the edging 14 or wherever the mesh 12 contacts the edging 14. Typically the edging 14 will be two layered, with one layer attached to a front face 11 of the mesh 12 and the second layer attached to a rear face 13 of the mesh 12. However, a single layer or more than two layers of edging 14 may be used provided the raw edge of the mesh 12 is secured to the edging 14. Alternatively, the edging 14 and the mesh 12 may be made from polymeric materials, such as nylon, Lycrag®, Spandext®, or combinations thereof, and may be made as a single molded piece with the raw edge of the mesh 12 melding into the edging 14, such as would be produced through injection molding of a nylon based polymer. Along the top edge 32 the edging 14 further includes a channel 20. The channel 20 extends along the entire length "1" of the top edge 32 and is wide enough to encase the flexible cord 22.

The flexible cord 22 is encased in the channel 20 along the top edge 32 of the mesh net 15, and protrudes from either end of the channel 20 slightly. On each end of the cord 22 is at least one attachment device 24. In use, the attachment devices 24 attach to supports, such as rods or hooks, that are mounted in the vehicle 50 to hold the net 10 upright. The cord 22 can be any highly elastic material, such as a bungee-type cord or a stretchable rope. The attachment device 24 can be any device that will allow the user to secure the cord 22 to the vehicle, such as an open hook, or a loop with a reversible closure similar to a keyring, and can be secured to the cord 22 by a variety of commonly known methods, such as gluing, hot melting, sewing, tying, and combinations thereof.

On the edging 14 along the lower edge 33 of the mesh net 15 are attached one or more heavy duty fasteners 30. The fasteners 30 allow the lower edge 33 of the net 10 to be secured to the shelf 40 in the boot 42. Preferably the fasteners 30 complement fastening devices, such as snaps, hooks, Velcro®, or combinations thereof, already in the vehicle.

In a preferred embodiment, the cargo net 10 is designed to fit the boot 42 of a Mazda Miata produced during model years 1989–1999. The cargo net 10 has a solid edged mesh net 15 having a rectangular shape with a length "l" of about 44" and a width "w" of about 7". The central mesh portion 12 is made from nylon fishnet, and the edging 14 is made from heavy duty polished cotton fabric. The edging 14 is formed from two layers of cotton fabric and is sewn onto the mesh 12 so that the exposed mesh 12 has a length "$l_m$" of about 41" and a width "$W_m$" of about 4". Along the top edge 32 a second row of stitches is made to create the channel 20, which has a diameter of approximately ⅝". A bungee cord 22, having a length of about 45" is threaded through the channel 20, and plastic hooks 24 are attached to each end of the cord 22. Two Tenex fasteners 30 are centered about 1" from each corner of the lower edge 33, and five Prym-Dritz fasteners 30' are essentially evenly spaced between the two Tenex fasteners 30.

Figure 3:
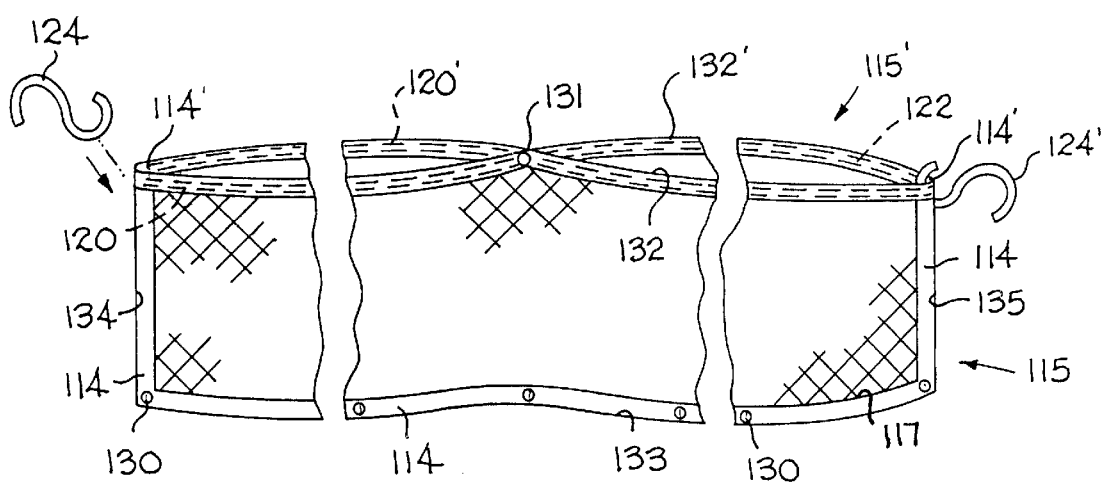
FIG. 3 is a perspective view of an alternative embodiment of a cargo net made in accordance with the present invention.

FIG. 3 shows an alternative embodiment of a cargo net 110 which is essentially identical to the net 10 of FIGS. 1 and 2 except two layers of the fabric edged mesh net 115, 115' are secured to each other so as to create a pocket 138. The fabric edged mesh net 115 is essentially identical to the mesh net 15 of FIG. 2, and has solid fabric edging 114 along the periphery 117. Along the top edge 132, the edging 114 includes a channel 120 wide enough to encase a flexible cord 122. The mesh portion 115' is essentially identical to the mesh portion 115, and is trimmed in edging 114' with a channel 120' along the top edge 132'. The mesh portions 115, 115' are secured to each other along the side 134, 135 and bottom 133 edges across the edging 114, 114', preferably along the periphery 117, by any of a variety of commonly known methods, such as sewing, gluing, hot melting, or a combination thereof, so as to create a pocket 138 between the mesh portions 115, 115'. Alternatively, the two mesh nets 115, 115' can be secured together along the bottom 133 and side 134, 135 edges by a single layer of edging 114 secured to the nets 115, 115' so as to cover the raw edges of the nets 115, 115' and form a double thickness layer of edging 114.

The edgings 114, 114' along the top edges 132, 132' are preferably not secured to each other so that each channel 120, 120' remains independent. The flexible cord 122 is threaded through one channel 120 and then through the second channel 120', and is optionally secured to itself so as to form a single continuous length of cord 122. The cord 122 secures at least one attachment device 124, 124' at each end of the channels 120, 120'. Heavy duty fasteners 130 are attached along the lower edge 133 of the cargo net 110, preferably such that they 130 protrude through the edging 114, 114'. Optional closures 131, such as snaps, Velcro strips, or zippers, may be included along the edging 114, 114' to keep the pocket 138 closed.

It is understood that, in light of a reading of the foregoing description and drawings, those with ordinary skill in the art will be able to make changes and modifications to the present invention without departing from the spirit or scope of the invention, as defined herein.

What is claimed is:

1. A cargo net for a vehicle having two passenger seats, a support secured to said vehicle, a cargo storage space located directly behind the passenger seats, and fastening devices secured to said vehicle in said cargo storage space, said net creating a barrier between said passenger seats and said cargo storage space, and said net comprising:
   a. a first mesh portion, having a periphery, and defining a top edge and a bottom edge;
   b. a solid fabric edging, secured to said mesh portion along the entire periphery, said edging being secured to said mesh portion such that a channel is created along the top edge;
   c. a flexible cord, defining first and second ends, encased within said channel such that the first and second ends protrude slightly beyond said channel;
   d. at least two attachment devices, a first such attachment device being attached to the first end of said cord and a second such attachment device being attached to the second end of said cord, said first and second attachment devices each being adapted to reversibly attach to said vehicle support; and
   e. at least one heavy duty fastener secured to the bottom edge of said mesh portion and adapted to be secured to said fastening devices in said cargo space.

2. The cargo net of claim 1 wherein said mesh portion is a loose weave material and said fabric edging is a tight weave material.

3. The cargo net of claim 1 wherein said mesh portion and said edging are made from polymeric materials and are molded as a single unit.

4. The cargo net of claim 1 further including a second mesh portion, having a periphery, secured to said first mesh portion along the peripheries so as to create a pocket between said first and second mesh portions.

5. A cargo net for a vehicle having two passenger seats, a support secured to said vehicle, a cargo storage space located directly behind the passenger seats, and fastening devices secured to said vehicle in said cargo storage space, said net creating a barrier between said passenger seats and said cargo storage space, and said net comprising:
   a. at least one pocket, defining a top edge and a bottom edge and two side edges, having a solid fabric edged mesh portion on a first side and a solid fabric edged mesh portion on a second side, said first and second sides being secured to each other along bottom and side edges, and said first and second sides each having a channel along top edges;
   b. a flexible cord, threaded through the channels along the top edge of the pocket such that a loop of said cord remains accessible near a first side edge of said pocket and the cord ends protrude slightly beyond the channels on a second side edge;
   c. at least two attachment devices, a first such attachment device being attached to said cord at the first side of said pocket and a second such attachment device being attached to said cord at the second side of said pocket, said first and second attachment devices each being adapted to reversibly attach to said vehicle support; and
   d. at least one heavy duty fastener secured to a bottom edge of said mesh portion and adapted to be secured to said fastening devices in said cargo space.

* * * * *